Dec. 10, 1968  J. R. HARKNESS  3,415,237
INTERNAL COMBUSTION ENGINE AND BALANCING MEANS THEREFOR
Filed Feb. 14, 1967  5 Sheets-Sheet 1

Inventor
Joseph R. Harkness

Dec. 10, 1968    J. R. HARKNESS    3,415,237
INTERNAL COMBUSTION ENGINE AND BALANCING MEANS THEREFOR
Filed Feb. 14, 1967    5 Sheets-Sheet 2

Inventor
Joseph R. Harkness

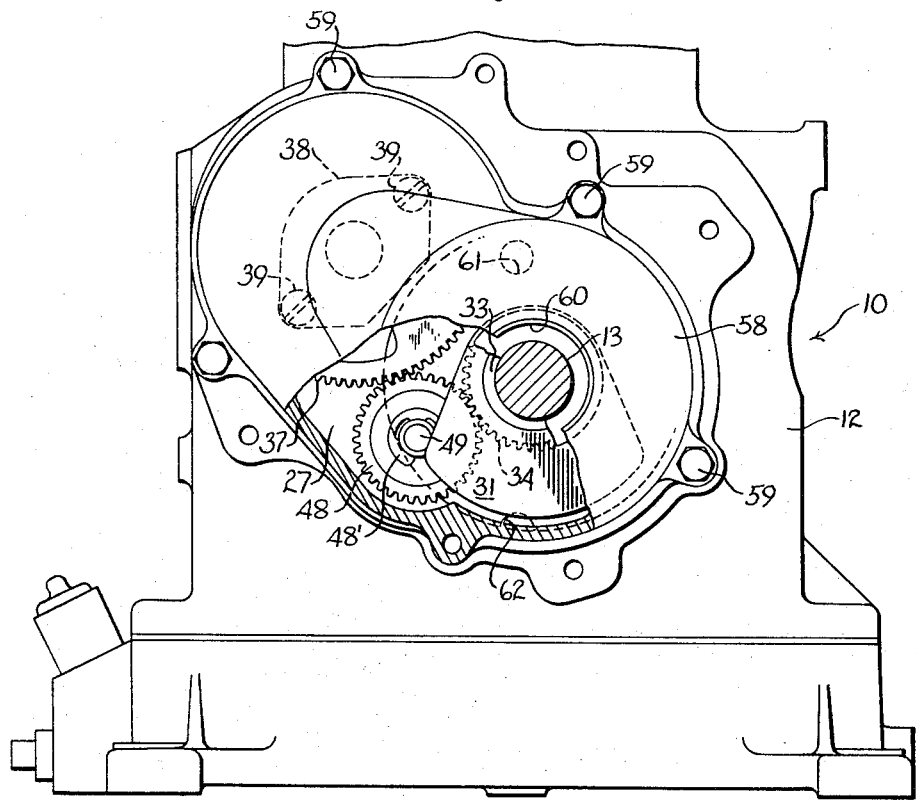
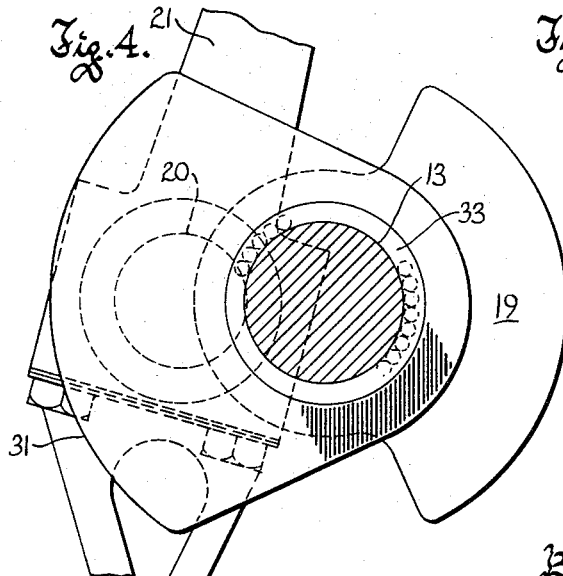
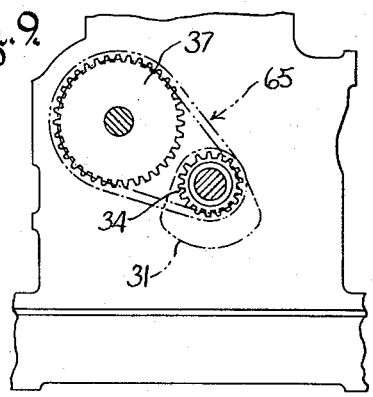

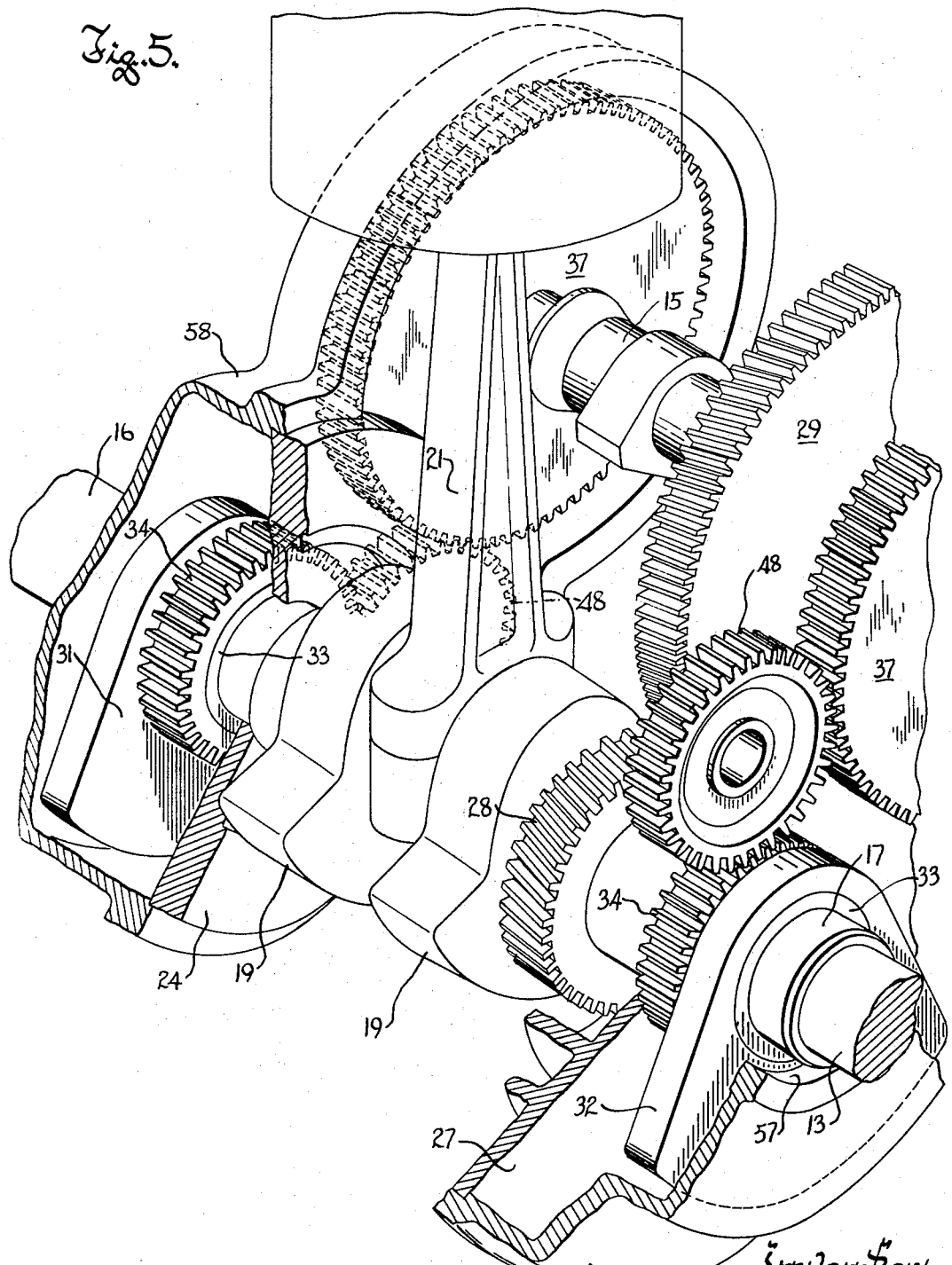

Dec. 10, 1968     J. R. HARKNESS     3,415,237
INTERNAL COMBUSTION ENGINE AND BALANCING MEANS THEREFOR
Filed Feb. 14, 1967     5 Sheets-Sheet 5

Inventor
Joseph R. Harkness

United States Patent Office 3,415,237
Patented Dec. 10, 1968

3,415,237
INTERNAL COMBUSTION ENGINE AND
BALANCING MEANS THEREFOR
Joseph R. Harkness, Germantown, Wis., assignor to Briggs
& Stratton Corp., Milwaukee, Wis., a corporation of
Delaware
Continuation-in-part of application Ser. No. 558,039,
June 16, 1966. This application Feb. 14, 1967, Ser.
No. 629,048
12 Claims. (Cl. 123—192)

ABSTRACT OF THE DISCLOSURE

Counterbalances mounted at the exterior of the crankcase of an internal combustion engine concentric to the axis of its crankshaft, are driven at crankshaft speed but in the opposite direction and so as to be in phase with the directly driven conventional crankshaft counterweights only at the dead center positions of the latter to minimize vibration.

---

Like my copending application Ser. No. 558,039, filed June 16, 1966, now abandoned, of which this application is a continuation-in-part, this invention relates to internal combustion engines, and has more particular reference to high speed single cylinder four stroke cycle engines of the horizontal shaft type.

Because engines of this nature are small and compact, they are widely used on a variety of gardening apparatus including tractors and riding mowers. While they provide an ideal power source for such apparatus, they have for long presented a particularly annoying problem which was most acute when the engines were used on tractors or mowing machines operated by an attendant riding on the machine.

This problem concerns the substantial vibration inherent in the operation of a single cylinder internal combustion engine. Through the engine mount and vehicle frame, such vibration is transmitted to the seat occupied by the driver, to the rests for his feet, and to the steering mechanism by which he maneuvers the apparatus. Thus, considerable discomfort can be experienced by the operator whenever the apparatus is in use, and severe driver fatigue can result in cases of continuous operation of the apparatus over an extended period of time.

As is well known, piston reciprocation is one of the main causes of vibration in a single cylinder four stroke cycle horizontal shaft engine, because of the force required to start and stop the piston twice each revolution of the engine crankshaft. Since this force acts along the cylinder axis, it can be decreased by providing the engine crankshaft with a counterbalance disposed 180° opposite the crankpin by which the crank end of the connecting rod is attached to the crankshaft. This counterbalance ordinarily comprises two eccentric weights arranged at opposite axial ends of the crank end of the connecting rod, symmetrically with respect to the cylinder axis. These weights overbalance the crankpin and the big end of the connecting rod. As a result, there is a net resultant centrifugal force vector diametrically opposite the crankpin.

The rotation of the crankshaft counterbalance, of course, produces centrifugal force one component of which can be considered as vertical and acting along the cylinder axis in opposition to the acceleration and deceleration forces on the assemblage comprising the piston, its wrist pin, and the connecting rod. In fact, by increasing the weight of the crankshaft counterbalance, the vertical component of its centrifugal force can be made to substantially balance or cancel out these forces on the piston assemblage. This can be termed a condition of 100% overbalance.

The centrifugal force due to the crankshaft counterweight, however, can be considered as also having a second component at right angles to the cylinder axis. This second component becomes undesirably larger as the weight of the counterbalance approaches the condition of 100% overbalance, and excessive vibration producing horizontal forces result.

It is for this reason that the counterbalances of engines of the type herein concerned are selected to achieve a condition of about 50% overbalance, so that the component of its centrifugal force along the cylinder axis is substantially equal to 50% of the acceleration force on the piston assemblage. As compared to a non-counterbalance crankshaft, therefore, this results in a decrease in the vertical vibration producing force which is approximately equal to the increase in forces at right angles to the cylinder axis.

As can be expected, this compromise in counterbalance weight has heretofore left relatively large forces acting both along the cylinder axis and at right angles to said axis, and substantial vibration during operation of the engine resulted. While several schemes have been proposed to further reduce such vibration producing forces, none of them has ever come into widespread use.

The best known proposal for achieving this purpose contemplated the use of two contra-rotating counterbalances timed and so proportioned that the vertical components of the centrifugal forces resulting from their rotation would be additive and in opposition to the piston forces to thus achieve 100% overbalance, while the horizontal components of the centrifugal forces would be in opposition so as to cancel each other. This would appear to effect an excellent balance between piston acceleration forces and the centrifugal forces due to the contra-rotating counterbalances, but various complications and disadvantages are inherent in this proposed engine balancing scheme. Additional torque or moments that tend to cause engine vibration result if the contra-rotating counterbalances are not symmetrical about the cylinder axis. Hence, if one of the counterweights is disposed on the engine crankshaft directly under the cylinder in the conventional way, not one, but two contra-rotating counterweights must be provided and so arranged that their effective center of force application is on the cylinder axis.

The required additional drive transmission means for effecting such contra-rotation of two additional counterweights, along with the problem of accommodating the weights and their drives in the already crowded interiors of compact single cylinder engines, discouraged widespread adoption of this method of decreasing engine vibration. Complete, or at least extensive, redesign of the engine seemed mandatory if the contra-rotating counterbalance scheme were to be employed.

With the aforementioned problems in mind, it is the purpose of this invention to provide a single cylinder four stroke cycle internal combustion engine in which vibration is reduced to a minimum through the use of a contra-rotating counterbalance that can be incorporated in existing engines with but minor modification thereof.

More specifically, it is the purpose of this invention to incorporate in a more or less conventional single cylinder four stroke cycle engine having the usual counterbalance on its crankshaft, an additonal counterbalance which is mounted externally of the engine crankcase, and which though concentric to the crankshaft axis, is indirectly driven thereby, from the engine camshaft, at the same speed as the crankshaft but in the opposite direction and in such phase relationship with the directly driven counterbalance that when the crankpin on the crankshaft is at either dead center position, the contra-rotating counterbalances will be at the opposite dead center position.

It is also a purpose of this invention to provide an internal combustion engine with contra-rotating counterbalances of the character described, wherein cover means secured to the exterior of the crankcase not only cooperates with the latter to house and protect the externally mounted counterbalance and the drive transmission means therefor, but can also support the contra-rotating counterbalances for rotation coaxially of the crankshaft.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention, constructed according to the best modes so far devised for the practical application of the principles thereof, and in which:

FIGURE 3 is an elevational view looking at the opposite end of the engine;

FIGURE 4 is an enlarged fragmentary detail view illustrating the timing of the contra-rotating counterbalances on the engine crankshaft;

FIGURE 5 is a somewhat diagrammatic perspective view illustrating the mechanism by which contra-rotation is imparted to the external counterbalance on the engine crankshaft;

FIGURE 9 is an end view of the engine similar to FIGURE 3 but at a reduced scale, and illustrating an alternative way of driving the counter-balances on the crankshaft.

Figure 1:
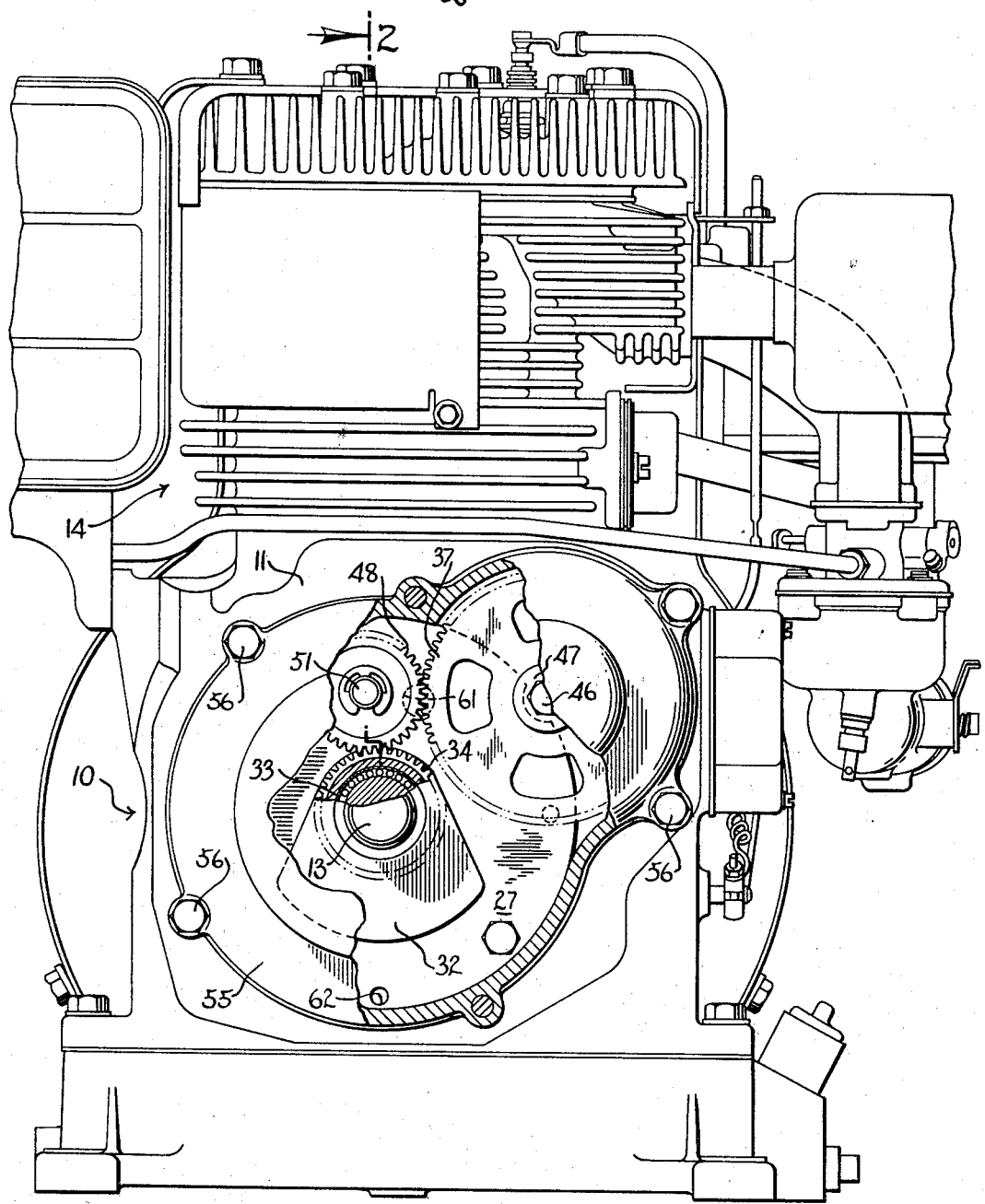
FIGURE 1 is an elevational view of one end of a balanced single cylinder four stroke cycle engine of this invention.

Referring now to the drawings, the single cylinder four stroke cycle engine therein shown comprises a crankcase 10 having opposite end walls 11 and 12 which support its crankshaft 13 for rotation on a horizontal axis, a cylinder 14 which rises from the top of the crankcase, and a camshaft 15 which is also supported from the end walls 11 and 12 for rotation on an axis parallel to but above and to one side of the crankshaft.

The opposite end portions 17 and 16 of the crankshaft project beyond the adjacent end walls 11 and 12, respectively of the crankcase, and a flywheel 18 is mounted on the crankshaft end portion 16 in the usual way. The crankshaft has the customary crankpin 20 and the conventional counterbalance provided by a pair of equal weights 19 eccentric to the shaft axis and spaced equal distances to opposite sides of the cylinder axis with their centers of gravity diametrically opposite the crankpin. A connecting rod 21 drivingly connects the crankpin with a piston 22 in the usual way.

The bearing 23, in which the end portion 16 of the crankshaft is journaled, is mounted in a bore in the end wall 12 of the crankcase and held in place therein by a retaining plate 24 suitably bolted to the exterior of the wall 12 and partially received in a counterbore 25 therein so that, in effect, the retaining plate provides a part of that end wall. The other crankshaft bearing 26 in which the end portion 17 of the crankshaft is journaled, is carried by a bearing plate 27 that is bolted to the exterior of the end wall 11 to also, in effect, provide a part of the latter. The retaining plate 24 and the bearing plate 27 have central apertures through which the end portions of the crankshaft project to the exterior of the engine.

The bearing 26 is located slightly farther from the adjacent counterbalance weight 19 than the bearing 23, to provide space on the crankshaft for the camshaft drive gear 28. The drive gear 28 meshes with a larger gear 29 on the camshaft so as to cause the latter to be driven from the crankshaft at one-half the speed thereof.

According to this invention, the internally mounted counterbalance weights 19 cooperate with a contra-rotating counterbalance comprising a pair of counterweights 31 and 32 carried by the opposite end portions of the crankshaft at locations externally of the crankcase and substantially equal distances from the cylinder axis, to reduce engine vibration to a minimum. Each of these external counterweights comprises a hub which is freely journaled on one end portion of the crankshaft as by a roller or needle bearing 33, and a gear 34 which can be integral with its hub and which is located between the counterweight and the plate on the exterior of the adjacent crankcase end wall. These external counterweights are driven from the camshaft 15, at the speed at which the crankshaft rotates but in the opposite direction.

Figure 6:
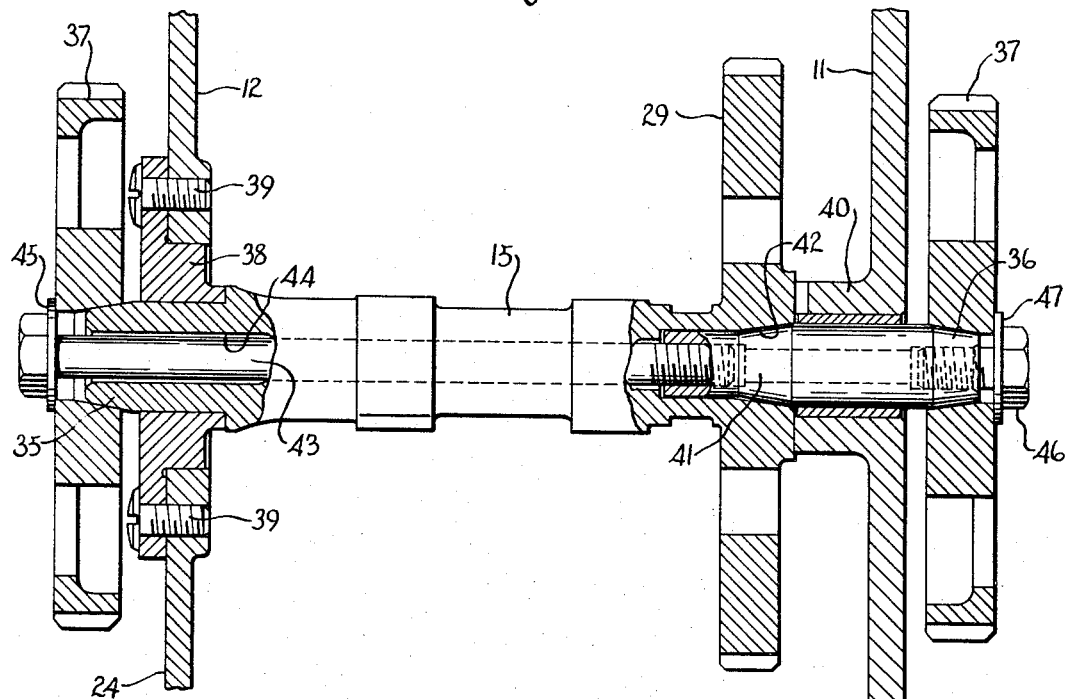
FIGURE 6 is an enlarged detail view of the camshaft assemblage, illustrating how the same is rotatably supported from the crankcase end walls, part thereof being in elevation and part in section.

For this purpose, the camshaft, like the crankshaft, is provided with axial extensions 35 and 36 which project beyond the opposite end walls of the crankcase, as seen best in FIGURE 6, to have identical gears 37 affixed to their projecting ends, each opposite one of the gears 34 on the externally mounted counterbalance weights. The extension 35 which passes through the end wall 12 of the crankcase is integral with the camshaft and is rotatably journaled in a bearing plate 38 that is secured by screws 39 to the end wall 12.

The other end extension 36 on the camshaft comprises a separate stub shaft which is rotatably journaled in a bearing boss 40 carried by the adjacent end wall 11 of the crankcase, and which has a frusto-conical inner end portion 41 that is received in a correspondingly shaped socket 42 coaxially formed in the adjacent end of the camshaft proper. The frusto-conical inner end portion of the stub shaft is wedged tightly in the socket to provide a driving connection between it and the camshaft by means of a rod bolt 43. This bolt has an elongated shank which is received in a bore 44 extending entirely through the camshaft, and is threaded into the inner end of the stub shaft. The head of the bolt exerts force on a washer 45 to hold the adjacent gear 37 in place on a tapered portion of the camshaft extension 35 and frictionally drivingly connected therewith.

The other gear 37 is drivingly engaged with a tapered portion on the outer end of the stub shaft 36 by means of a bolt 46 having its shank threaded into the stub shaft, and its head bearing upon a washer 47 that seats against the outer face of the stub shaft gear 37.

Figure 7:
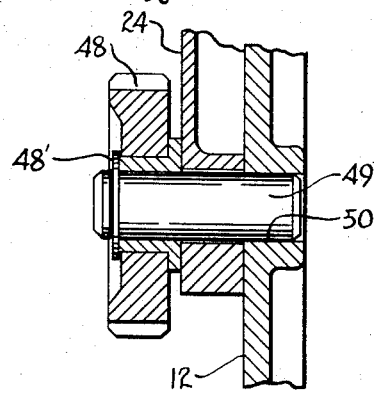
FIGURES 7 and 8 are enlarged sectional views of parts of the drive transmission means for the externally mounted counterbalance.
Figure 8:
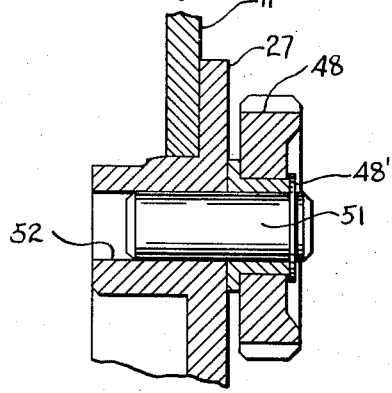

Rotation is transmitted from each camshaft gear 37 to the gear 34 on the hub of the adjacent external counterbalance weight 31 or 32, either through a silent chain drive 65—as more or less diagrammatically illustrated in FIGURE 9—or through an idler gear 48 to assure that the external counterbalance weights will be driven in a direction counter to crankshaft rotation. As seen in FIGURE 7, one of the idler gears 48 is freely rotatably mounted on the outer end of a stub shaft 49 that passes loosely through a portion of the retaining plate 24 to have its inner end portion fixed in a bore 50 in the end wall 12 of the crankcase. The other idler 48 seen in FIGURE 8, is similarly freely rotatably mounted on the outer end portion of a stub shaft 51 that has its inner end portion fixed in a bore 52 in the adjacent bearing plate 27. Conventional C-washers 48' hold the idler gears on their respective stub shafts.

Figure 2:
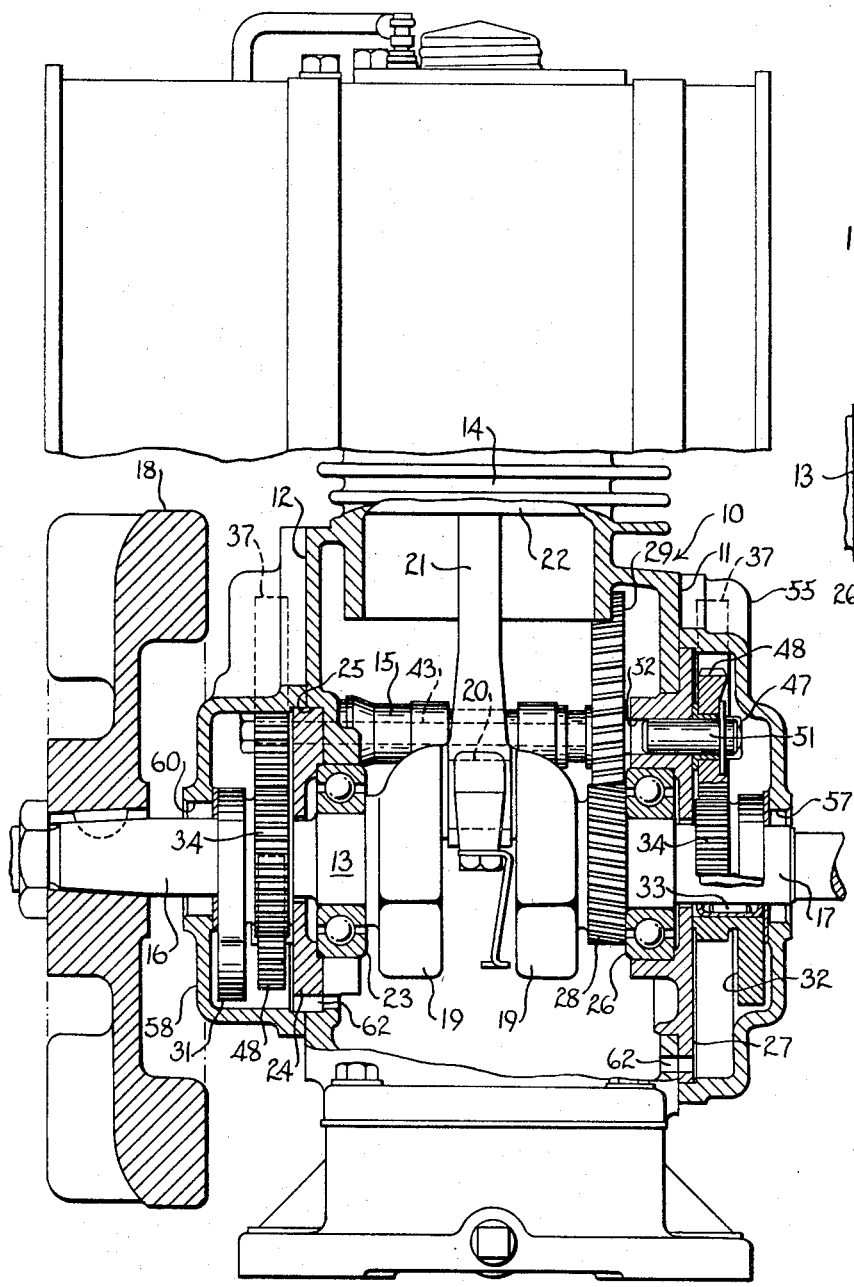
FIGURE 2 is a vertical sectional view through the crankcase of the engine, taken on the line 2—2 of FIGURE 1.

The camshaft gears 37 and their respective idler gears 48 provide two-to-one ratio transmission means for imparting rotation to the externally mounted counterbalance weights 31–32 at the same speed as the crankshaft but in the opposite direction. In this respect, it is important to note that the transmission means described maintains the externally mounted counterbalance weights in such phase relation to the internal counterbalance weights 19, that all four counterbalance weights will be in pendent positions at the bottom of their orbits when the crankpin 20 is at top dead center, as seen in FIGURES 2 and 5, and will similarly be at the top of their orbits when the crankpin is at bottom dead center. Thus, each time the crankpin passes through a horizontal plane containing the crankshaft axis, the external counterbalance weights 31–32 will be at the same side of the crankshaft axis as crankpin, and the internal weights 19 will be at the opposite side thereof, as seen in FIGURE 4.

From this it will be evident that all four counterbalance weights will move upwardly as the piston 22 travels downwardly, and downwardly when the crankpin and piston travel upwardly. Thus, by properly proportioning the weights, substantially all of the force necessary to start the piston moving and to stop it twice each revolution of the crankshaft will be balanced and offset by the sum of the vertical components of the centrifugal forces resulting from rotation of the internal and external counterbalances. Also, due to the contra-rotation of the counterbalances, the horizonal or lateral components of their centrifugal forces will cancel each other, so as to thereby minimize vibration of the engine during its operation.

A cover 55, seen best in FIGURES 1 and 2, is secured to the end wall 11 of the crankcase by cap screws 56, to enclose the external counterbalance weight 32 and its associated drive mechanism. This cover cooperates with the adjacent end wall and the bearing plate 27 thereon to define a compartment in which the counterbalance weight and its drive gearing are housed. A hole 57 in the cover accommodates the adjacent projecting end portion 17 of the crankshaft.

Another cover 58, seen in FIGURES 2 and 3, is secured by cap screws 59 to the other end wall 12 of the crankcase to cooperate with that end wall and with the bearing plate 38 and the retaining plate 24 thereon to define a compartment in which the adjacent external counterbalance weight 31 and is associated drive gearing are housed. This cover has an aperture 60 through which the end portion 16 of the crankshaft projects to have the flywheel 18 mounted thereon outwardly of the cover. To provide lubrication for the transmission gearing driving the counterweights 31 and 32 and the bearings thereof, both compartments are communicated with the crankcase interior by inlet ports 61 located above the level of the crankshaft and drain ports 62 so that oil from the crankcase may freely enter and leave the compartments.

In the engine described, the cylinder and crankcase comprise a single body casting in which the various moving parts of the engine are installed. It is significant to note that this invention makes possible the use of contra-rotating counterbalance means on the engine without changing the design of its body casting. Aside from the provision of relatively inexpensive covers and bearing plates which attach to the exterior of the crankcase, the contra-rotating counterbalance and drive transmission means therefor can be externally applied to existing engines with but a minimum of modification to its moving parts.

It will be apparent that the benefits of the contra-rotating counterbalance described above are not necessarily limited to four stroke cycle engines, but that by simply providing a suitable drive transmission driven from the crankshaft and connected with the hub of the counterbalance, the invention is applicable to two stroke cycle engines which have no cam shafts. By the same token, compressors of the reciprocating piston type can be benefited by this invention.

Figure 10:
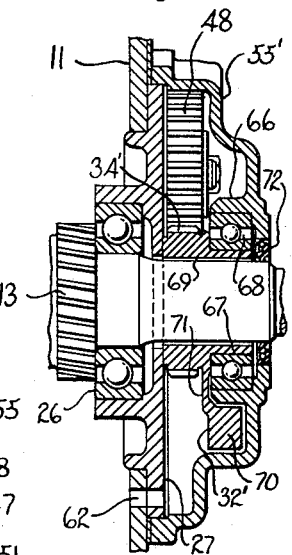
FIGURE 10 is a sectional view showing how the contra-rotating counterbalances can be supported by the crankcase covers for rotation on axes coincident with that of the crankshaft.

In both embodiments of the invention described, the contra-rotating counterbalances 31 and 32 are supported by bearings mounted directly on the opposite end portions 16 and 17 of the crankshaft. It is also possible to support both external counterbalances from their adjacent crankcase covers 55 and 58 for rotation on axes coincident with that of the crankshaft, with no part of the counterbalances in contact with the crankshaft. FIGURE 10 illustrates how this can be done, although it shows the necessary modifications in structure only at one end portion 17 of the crankshaft.

As seen in FIGURE 10, the inner side of the cover 55' is formed with a bearing supporting ring 66 concentric with the axis of the crankshaft and which ring encircles the hub 67 on the adjacent counterweight 32' in radially spaced relation thereto. This space accommodates a ball bearing 68, whereby the counterweight is supported on the inner side of the cover for rotation about an axis coincident with that of the crankshaft. The hub 67 of the counterweight 32' has a bore 69 of a size such that the hub clears the crankshaft, and it can have the gear 34' formed integrally therewith and located to mesh with the idler gear 48 as before.

The main body 70 of the counterweight 32' travels in an orbit around the bearing supporting ring 66, and it is connected to the hub 67 by a web 71 which extends radially along the inner side of the bearing 68 and its supporting ring. A seal 72 in the shaft receiving bore 57 of the cover engages the projecting end of the crankshaft to prevent oil from leaking out of the compartment beneath the cover after such oil has passed through the bearing 68.

From this description, it will be apparent that the mounting of the external of contra-rotating counterweights on the covers, rather than on the crankshaft, is advantageous in that it reduces bearing speed by one-half, and thus minimizes wear on the bearings, and any tendency for them to overheat during operation of the engine.

From the foregoing description, together with the accompanying drawings, it will be readily apparent that this invention provides an exceptionally practicable way of significantly reducing the vibration normally resulting from the operation of high speed single cylinder reciprocating piston type machines, such as single cylinder internal combustion engines.

What is claimed as my invention is:

1. An internal combustion engine having a cylinder, a crankcase, a crankshaft with an eccentric counterbalance thereon opposite its crankpin, a camshaft driven by the crankshaft, and opposite end walls on the crankcase from which the crankshaft and the camshaft are rotatably supported, characterized by the following:
    (A) means on the crankshaft and the camshaft providing axial extensions thereof which project beyond both of said end walls of the crankcase;
    (B) a cover secured to each of the end walls and cooperating therewith to define an external compartment on the crankcase into which the adjacent shaft extensions project;
    (C) an eccentric counterweight in each of said compartments, each eccentric counterweight having a hub;
    (D) bearing means concentric with the crankshaft axis and supportingly engaging each hub to mount its eccentric counterweight for free rotation about the crankshaft axis; and
    (E) drive transmission means in each of said compartments connecting the hub of the counterweight therein with the adjacent projecting portion of the camshaft to drive the counterweight at crankshaft speed but counter to the direction of crankshaft rotation, and with the eccentric masses of the counterweight and crankshaft counterbalance in such phase relation as to be opposite one another whenever the crankpin is in a position medially between its two dead center positions.

2. The internal combustion engine of claim 1 wherein said counterweights are located substantially equal axial distances from the crankshaft counterbalance.

3. The internal combustion engine of claim 1, wherein said drive transmission means for each counterweight comprises an endless flexible tension member trained around elements fixed on the camshaft and on the hub of the counterweight.

4. The internal combustion engine of claim 1, wherein said drive transmission means for each counterweight comprises a drive gear on the camshaft, a driven gear connected to the hub of the counterweight, and a common idler gear meshing with both of said gears.

5. The internal combustion engine of claim 1, wherein said bearing means are mounted on the covers, and the hubs of the counterweights encircle the crankshaft and are bored to clear the same.

6. The internal combustion engine of claim 4, wherein said bearing means are mounted on the crankshaft.

7. The internal combustion engine of claim 4, further characterized by the following:
   (A) a bearing plate secured to the exterior of one of said end walls and having the adjacent end portion of the crankshaft rotatably supported therein; and
   (B) said bearing plate cooperating with the adjacent cover to provide the compartment at the exterior of said last mentioned end wall.

8. The internal combustion engine of claim 7, further characterized by the following:
   (A) a stub shaft fixed in said bearing plate and projecting therefrom into the adjacent compartment to rotatably support the idler gear therein; and
   (B) means on the projecting end of the stub shaft precluding axial displacement of the idler gear therefrom.

9. An internal combustion engine having a cylinder, a crankcase, a crankshaft with an eccentric counterbalance thereon opposite its crankpin, a camshaft driven by the crankshaft, and opposite end walls on the crankcase from which the crankshaft and camshaft are rotatably supported, characterized by the following:
   (A) means in each end of the crankshaft and the camshaft providing axial extensions thereof which project beyond said end walls of the crankcase;
   (B) identical gears freely encircling the projecting end portions of the crankshaft and located directly adjacent to the exteriors of the crankcase end walls;
   (C) an eccentric counterweight fixed to each of said gears, at the side thereof remote from the adjacent crankcase end wall,
      said counterweights being substantially equidistant from the cylinder axis;
   (D) gearing closely overlying each of said crankcase end walls and drivingly connecting each of said gears with the camshaft,
      said gearing effecting rotation of the counterweights at crankshaft speed but counter to crankshaft rotation, and in such phase relationship with the crankshaft counterbalance that the eccentric masses of the counterweights are diametrically opposite the crankshaft counterbalance whenever the crankpin is in a position medially between its dead center positions;
   (E) covers secured to each of said crankcase end walls to enclose the counterweights and the gearing drivingly connecting them with the camshaft; and
   (F) bearing means carried by said covers to freely journal said gears for rotation about axes coincident with that of the crankshaft.

10. The internal combustion engine of claim 9, wherein:
   said covers cooperate with the end walls of the crankcase to define compartments, each of which has inner and outer walls between which said gearing and the counterweights are confined.

11. The internal combustion engine of claim 9, further characterized by:
   (A) said camshaft comprising axially separable camshaft sections, and;
   (B) means detachably securing said camshaft sections together,
      said last named means being accessible upon removal of one of said covers.

12. A reciprocating piston machine having a cylinder, a crankcase, a crankshaft with an eccentric counterbalance thereon opposite its crankpin, and opposite end walls on the crankcase from which the crankshaft is rotatably supported, characterized by the following:
   (A) means on the crankshaft providing axial extensions thereof which project beyond said end walls of the crankcase;
   (B) a cover secured to each of said end walls and cooperating therewith to define an external compartment on the crankcase into which the adjacent crankshaft extension projects;
   (C) an eccentric counterweight in each of said compartments, each eccentric counterweight having a hub surrounding its adjacent crankshaft extension;
   (D) bearing means concentric with the crankshaft axis supportingly engaging said hubs to mount the eccentric counterweights for free rotation about the crankshaft axis; and
   (E) drive means in each compartment driven from the crankshaft and connected with the hub of the counterweight therein to drive the counterweight at crankshaft speed but counter to the direction of crankshaft rotation, and with the eccentric masses of the counterweight and crankshaft counterbalanced in such phase relation as to be opposite one another whenever the crankpin is in a position medially between its two dead center positions.

References Cited

UNITED STATES PATENTS

| 2,407,102 | 9/1946 | Ryder | 74—604 |
| 3,203,274 | 8/1965 | Barth et al. | 123—192 XR |
| 2,284,515 | 5/1942 | Criswell | 123—192 |

WENDELL E. BURNS, *Primary Examiner.*

U.S. Cl. X.R.

74—604